(12) United States Patent
Huang et al.

(10) Patent No.: US 10,179,943 B2
(45) Date of Patent: Jan. 15, 2019

(54) CORROSION RESISTANT ARTICLE AND METHODS OF MAKING

(71) Applicant: General Electric Company, Schenectady, NY (US)

(72) Inventors: Shenyan Huang, Niskayuna, NY (US); Richard Didomizio, Charlton, NY (US); Raul Basilio Rebak, Schenectady, NY (US)

(73) Assignee: GENERAL ELECTRIC COMPANY, Schenectady, NY (US)

( * ) Notice: Subject to any disclaimer, the term of this patent is extended or adjusted under 35 U.S.C. 154(b) by 957 days.

(21) Appl. No.: 14/334,742

(22) Filed: Jul. 18, 2014

(65) Prior Publication Data

US 2016/0017464 A1    Jan. 21, 2016

(51) Int. Cl.
*B22F 3/24* (2006.01)
*C22C 33/02* (2006.01)
(Continued)

(52) U.S. Cl.
CPC ............ *C22C 33/0285* (2013.01); *B22F 3/15* (2013.01); *B22F 3/17* (2013.01); *B22F 3/20* (2013.01);
(Continued)

(58) Field of Classification Search
None
See application file for complete search history.

(56) References Cited

U.S. PATENT DOCUMENTS

| 4,075,010 A | 2/1978 | Fischer |
| 4,798,634 A | 1/1989 | McCune, III et al. |

(Continued)

FOREIGN PATENT DOCUMENTS

| CN | 1050744 A | 4/1991 |
| CN | 102031995 A | 4/2011 |

(Continued)

OTHER PUBLICATIONS

Bond, A.P. et al., "The Effect of C and N on the Properties of Fe—Cr—Mo Ferritic Stainless Steels", Journal of Vacuum Science and Technology, IEEE, Nov. 1972, vol. 9 , Issue: 6, 2 Pages.

(Continued)

*Primary Examiner* — Jessee R Roe
*Assistant Examiner* — Ngoclan T Mai
(74) *Attorney, Agent, or Firm* — GE Global Patent Operation; Mark A. Vivenzio

(57) ABSTRACT

An article and method of forming the article are disclosed. The article has a surface comprising a nanostructured ferritic alloy. The surface includes a plurality of nanofeatures that include complex oxides of yttrium and titanium disposed in an iron-bearing alloy matrix. The iron-bearing alloy matrix at the surface includes about 5 weight percent to about 30 weight percent of chromium, and about 0.1 weight percent to about 10 weight percent of molybdenum. Further, a concentration of a chi phase or a sigma phase in the nanostructured ferritic alloy at the surface is less than about 5 volume percent. The method generally includes the steps of milling, thermo-mechanically consolidating, annealing, and then cooling at a rate that hinders the formation of chi and sigma phases in the nanostructured ferritic alloy at the surface.

9 Claims, 2 Drawing Sheets

(51) Int. Cl.
*B22F 3/15* (2006.01)
*B22F 3/17* (2006.01)
*B22F 3/20* (2006.01)
*C22C 38/22* (2006.01)
*C22C 32/00* (2006.01)
*F16C 33/12* (2006.01)

(52) U.S. Cl.
CPC ............ *B22F 3/24* (2013.01); *C22C 33/0228* (2013.01); *C22C 38/22* (2013.01); *B22F 2207/01* (2013.01); *B22F 2998/10* (2013.01); *C22C 32/0026* (2013.01); *F16C 33/121* (2013.01); *F16C 2204/70* (2013.01); *F16C 2240/40* (2013.01); *F16C 2300/42* (2013.01)

(56) References Cited

U.S. PATENT DOCUMENTS

| | | | |
|---|---|---|---|
| 4,799,972 A | 1/1989 | Masuyama et al. | |
| 5,154,781 A | 10/1992 | Catellier | |
| 5,352,406 A | 10/1994 | Barteri et al. | |
| 5,407,744 A | 4/1995 | Mallen Herrero et al. | |
| 5,480,609 A | 1/1996 | Dupoiran et al. | |
| 5,944,921 A | 8/1999 | Cumino et al. | |
| 6,051,081 A | 4/2000 | Valle Echevarria et al. | |
| 6,767,416 B2 | 7/2004 | Ishibashi et al. | |
| 6,793,744 B1 | 9/2004 | Jung | |
| 6,899,773 B2 | 5/2005 | Buck | |
| 7,662,244 B2 | 2/2010 | Yoshizawa et al. | |
| 7,749,431 B2 | 7/2010 | Igarashi et al. | |
| 7,892,366 B2 | 2/2011 | Lindh | |
| 8,357,328 B2 | 1/2013 | Didomizio et al. | |
| 8,361,247 B2 | 1/2013 | Vartanov | |
| 8,616,851 B2 | 12/2013 | Didomizio et al. | |
| 2012/0107603 A1 | 5/2012 | Didomizio et al. | |
| 2014/0238552 A1* | 8/2014 | Forbes Jones | C21D 8/005 148/501 |
| 2015/0004043 A1 | 1/2015 | Didomizio et al. | |
| 2015/0033912 A1 | 2/2015 | Dial et al. | |
| 2015/0167129 A1 | 6/2015 | Didomizio et al. | |

FOREIGN PATENT DOCUMENTS

| | | |
|---|---|---|
| CN | 103194689 A | 7/2013 |
| JP | 04173939 A | 6/1992 |
| JP | 2001049335 A | 2/2001 |

OTHER PUBLICATIONS

Odette et al., "Irradiation-tolerant nanostructured ferritic alloys: Transforming helium from a liability to an asset", JOM, Springer Link, Sep. 2010, vol. 62, Issue 9, pp. 84-92.

PCT Search Report and Written Opinion issued in connection with corresponding Application No. PCT/US2015/039717 dated Nov. 9, 2015.

Machine Translation and First Office Action and Search issued in connection with corresponding CN Application No. 201580039071.5 dated Feb. 2, 2018.

* cited by examiner

CORROSION RESISTANT ARTICLE AND METHODS OF MAKING

BACKGROUND

The invention relates generally to nanostructured ferritic alloys and articles made of such alloys. More particularly, the invention relates to an article having a nanostructured ferritic alloy surface with good corrosion resistance, and methods of forming the article.

Material selection is especially important in equipment components used in sour and acid environments commonly associated with oil and gas extraction installations. Sour gas wells may contain carbon dioxide, chlorides, hydrogen sulfides, and free sulfur, and may operate at temperatures up to 400° C. This type of corrosive environment requires carefully designed alloys to enable components to maintain their structural integrity over their service life.

Conventional corrosion resistant steels include ferritic, austenitic, and ferritic/austenitic duplex steels. In general, ferritic steels have improved stress corrosion cracking resistance in chloride-containing environments, but the strength is relatively low. Austenitic and duplex steels have good corrosion resistance, low to intermediate strength, but inferior stress corrosion cracking resistance.

Nickel-based super alloys have high strength, corrosion resistance, and stress-corrosion cracking resistance. Ni-based super alloys generally include nickel (Ni), as well as other elements such as iron (Fe), chromium (Cr), molybdenum (Mo), tungsten (W), and copper (Cu). Nickel provides resistance to aqueous chloride stress corrosion cracking and provides resistance to alkalis, while iron is generally added to reduce the use of nickel, where appropriate. Molybdenum and tungsten are beneficial for pitting corrosion resistance and provides general corrosion resistance in reducing acids. Chromium improves general corrosion resistance in oxidizing acidic media. Copper is found to be beneficial for general corrosion resistance in non-oxidizing corrosion environments. Relative concentrations of Ni—Fe—Cr—Mo—Cu, along with alloy processing and service history of the component, in part determine overall corrosion resistance in oil and gas applications. Because higher nickel content increases the cost of raw materials, there is a need for alloys with lower nickel content than typical superalloys but having mechanical strength and corrosion resistance in sour and acid environment superior to conventional steels.

BRIEF DESCRIPTION

One embodiment of the invention is directed to an article. The article has surface, and this surface includes a nanostructured ferritic alloy. The alloy includes a plurality of nanofeatures disposed in an iron-bearing alloy matrix; this plurality includes complex oxide particles that include yttrium, titanium, and optionally other elements. The iron-bearing alloy matrix disposed at the surface includes about 5 weight percent to about 30 weight percent of chromium, and about 0.1 weight percent to about 10 weight percent of molybdenum. Further, a concentration of a chi phase or a sigma phase in the nanostructured ferritic alloy disposed at the surface is less than about 5 volume percent.

Another embodiment of the invention is directed to a method. The method generally includes the steps of milling, thermo-mechanically consolidating, annealing, and cooling. In the milling step, an iron-bearing alloy powder is milled in the presence of yttrium oxide until the oxide is substantially dissolved into the alloy. The milled powder is consolidated, often under an inert environment, to form consolidated component, which is then annealed above the solvus temperature of chi and sigma phases and cooled at a rate that prevents the formation of chi and sigma phases to form a processed component having the characteristics noted previously for the article.

DETAILED DESCRIPTION

Embodiments of the invention described herein address the noted shortcomings of the state of the art. One or more specific embodiments of the present invention will be described below. In an effort to provide a concise description of these embodiments, all features of an actual implementation may not be described in the specification. It should be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

When introducing elements of various embodiments of the present invention, the articles "a," "an," and "the" are intended to mean that there are one or more of the elements. The terms "comprising," "including," "involving," and "having" (and their associated tense forms) are intended to be inclusive and mean that there may be additional elements other than the listed elements. All ranges disclosed herein are inclusive of the endpoints, and the endpoints are combinable with each other.

Approximating language, as used herein throughout the specification and claims, may be applied to modify any quantitative representation that could permissibly vary without resulting in a change in the basic function to which it may be related. Accordingly, a value modified by a term such as "about" is not limited to the precise value specified. In some instances, the approximating language may correspond to the precision of an instrument for measuring the value.

In general, embodiments of this invention are directed to the formation of Fe—Cr—Mo-based nanostructured ferritic alloys (NFAs) with mechanical strength and corrosion resistance superior to conventional steels in sour and acid environments. This material has potential application for structural components used in sour and acid environments at temperatures below 400° C., which enables better lifetime at higher operating stress levels and harsher environments than typically observed for conventional steels.

NFA is a new class of oxide dispersion-strengthened alloys fabricated by mechanical alloying. Appropriate milling and subsequent processing generate a unique microstructure of fine grains and densely distributed inter- and intragranular nanofeatures; this microstructure is responsible in large part for NFA's high strength and good ductility.

Figure 1:
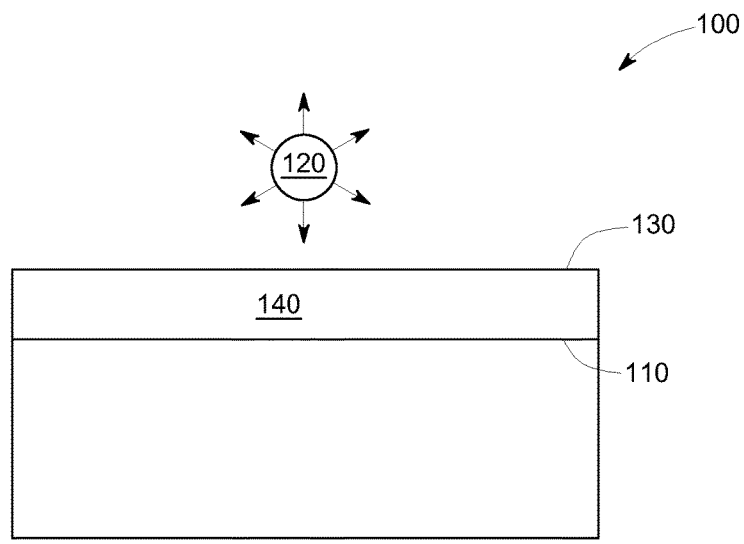
FIG. 1 is a schematic cross section of an article in accordance with an embodiment of the present invention.

Referring to FIG. 1, one embodiment of the present invention is directed to an article 100. The article 100 includes a surface 110 that includes a corrosion resistant nanostructured ferritic alloy. The alloy includes a plurality of nanofeatures that includes complex oxide particles comprising yttrium, titanium, and possibly other elements, disposed in an iron-bearing alloy matrix. At surface 110, the iron-bearing alloy matrix includes about 5 weight percent to about 30 weight percent of chromium, and about 0.1 weight percent to about 10 weight percent of molybdenum. Further, a concentration of a chi phase or a sigma phase at surface 110 is less than about 5 volume percent.

The corrosion resistance of the nanostructured ferritic alloy in many environments is generally proportional to the concentrations of molybdenum and chromium dissolved within the matrix of the alloy. However, as concentrations of these elements are increased in iron-bearing alloys, the thermodynamics of the alloy chemistry increasingly favor the formation of intermetallic phases, such as the above-mentioned chi phase and sigma phase that are rich in molybdenum and/or chromium. As these phases form, they remove molybdenum and chromium from the matrix, sequestering these desirable elements into the intermetallic compounds and leaving behind a depleted matrix that is substantially less corrosion resistant than it would be if the elements remained in solution. Thus the article 100 of the present invention is engineered to provide a surface 110 made of the described nanostructured ferritic alloy and yet, at least at surface 110, maintains high levels of molybdenum and chromium dissolved within the matrix, often levels in excess of the solubility limits that would be expected for thermodynamic equilibrium.

Surface 110 of article 100 is a surface that is disposed proximate to, or in actual contact with, the ambient environment 120. As corrosion is typically a surface-driven phenomenon, it is this surface 110 whose characteristics are often very important in determining the corrosion resistance of the article 100. In embodiments of the present invention, at least this surface 110 has the above-described composition, although it should be appreciated that the composition need not be limited to only the very surface 110 of the article; any volume fraction of the article 100, including substantially all of article 100, may include the nanostructured ferritic alloy, and any volume fraction of the nanostructured ferritic alloy, including substantially all of the alloy present in article 100, may include the composition and other characteristics described herein. Moreover, surface 110 need not be the outermost surface 130 of article 100 (that is, the surface in contact with ambient environment 120); optionally, one or more outer layers 140, such as, for instance, a paint layer, a conversion coating, a thermal barrier coating, or other layer or combination of layers, may be disposed over surface 110.

As noted above, the NFA composition includes a plurality of nanofeatures disposed in an iron-bearing alloy matrix. The NFA disclosed herein typically includes an alloy matrix that is in the form of the ferritic body-centered cubic (BCC) phase known in the art as "alpha iron" or simply "alpha." The NFA composition generally includes at least about 30 weight percent iron, with the particular amount often depending on the degree of alloying (that is, the amount of other elements added to the iron) needed to achieve the desired balance of properties; in some embodiments the composition includes at least about 50 weight percent iron, and at least about 70 weight percent iron in particular embodiments. The iron-bearing alloy matrix is strengthened by the nanofeatures disposed in the matrix. As used herein, the term "nanofeature" means a feature, such as a particulate phase, that has a longest dimension less than about 50 nanometers in size. Nanofeatures may have any shape, including, for example, spherical, cuboidal, lenticular, and other shapes. The mechanical properties of the nanostructured ferritic alloy may be controlled by controlling, for example, the density (meaning the number density, that is, the number of particles per unit volume) of the nanofeatures in the matrix; the grain size, determined by size and distribution of nanofeatures and processing conditions; the composition of the nanofeatures; and the processing methods used to form the article.

Typically, as number density of nanofeatures increases, the strength increases and the ductility decreases, and thus the selection of a desired level will in part be determined by the tradeoff between these properties for any given application. In one embodiment, the nanofeatures have a number density of at least about $10^{18}$ nanofeatures per cubic meter of the nanostructured ferritic alloy. In another embodiment, the nanofeatures have a number density of at least about $10^{20}$ per cubic meter of the nanostructured ferritic alloy. In yet another embodiment, the nanofeatures have a number density in a range from about $10^{21}$ to $10^{24}$ per cubic meter of the nanostructured ferritic alloy.

Maintaining a fine dispersion of nanofeatures is advantageous in that the nanofeatures may act to impede dislocation motion. In one embodiment, the nanofeatures have an average size in a range from about 1 nanometer to about 50 nanometers. In another embodiment, the nanofeatures have an average size in a range from about 1 nanometer to about 25 nanometers. In yet another embodiment, the nanofeatures have an average size in a range from about 1 nanometer to about 10 nanometers.

Nanofeatures present in the nanostructured ferritic alloy described herein include oxides. The composition of the oxides will depend in part on the composition of the alloy matrix, composition of the raw materials used in processing the material, and the processing methods used to prepare the NFA, which will be discussed in more detail below. In the embodiments described herein, the plurality of nanofeatures includes a plurality of complex oxide particles. A "complex oxide" as used herein is an oxide phase that includes more than one non-oxygen element. In embodiments of the present invention, the complex oxide particles comprise yttrium and titanium, and in certain embodiments one or more additional elements may be present as well. Examples of such elements include, but are not limited to, aluminum, zirconium, and hafnium, as well as other elements that may be present in the matrix, such as, for example, iron, chromium, molybdenum, tungsten, manganese, silicon, niobium, nickel, tantalum.

In one embodiment, the alloy matrix of the NFA comprises titanium, and at least about 35 weight percent iron. In some embodiments, the titanium is present in the range from about 0.1 weight percent to about 2 weight percent. In certain embodiments, the alloy matrix comprises from about 0.1 weight percent titanium to about 1 weight percent titanium. In addition to its presence in the matrix, titanium plays a role in the formation of the oxide nanofeatures, as described above. In one embodiment, the concentration of titanium in the nanoferritic alloy is in a range from about 0.15 wt % to about 2 wt %.

The plurality of nanofeatures of the NFA may further include simple or complex oxides other than the specific complex oxides described above. A "simple oxide" as used herein is an oxide phase that has one non-oxygen element, such as, for example, yttrium or titanium.

In one embodiment, the surface 110 of the article 100 has outstanding corrosion resistance, which is a result of the high concentration of chromium and molybdenum in the ferritic matrix. For example, the percentage of molybdenum and/or chromium may exceed the levels found in most conventional ferritic steels, and in fact may exceed the equilibrium solubility in the matrix, which makes the alloy thermodynamically metastable. On the other hand, the kinetics of achieving thermodynamic equilibrium, in particular the precipitation kinetics of molybdenum and chromium enriched secondary phases such as chi phase and sigma phase, is expected to be extremely slow at relatively low temperatures (below 400° C.), such that substantial molybdenum will stay in the supersaturated matrix to provide improved corrosion resistance during the lifetime of the article.

In keeping with the above description, comparatively high levels of both chromium and molybdenum dissolved within the NFA matrix are desirable. For example, the iron-bearing alloy matrix includes about 5 weight percent to about 30 weight percent chromium. In one embodiment, the concentration of chromium in the iron-bearing alloy matrix of the NFA is in a range from about 10 weight percent to about 30 weight percent. In yet another embodiment, the concentration of chromium in the iron-bearing alloy matrix of the NFA is in a range from about 15 weight percent to about 30 weight percent.

In a similar vein, the iron-bearing alloy matrix includes about 0.1 weight percent to about 10 weight percent of molybdenum. In one embodiment, the concentration of molybdenum in the iron-bearing alloy matrix of the NFA is in a range from about 3 weight percent to about 10 weight percent. In another embodiment, the concentration of molybdenum in the iron-bearing alloy matrix of the NFA is in a range from about 5 weight percent to about 10 weight percent. In yet another embodiment, the concentration of molybdenum in the iron-bearing alloy matrix of the NFA varies in a range from about 6 weight percent to about 10 weight percent.

The above compositional constraints, and indeed any compositional alternatives provided herein for the NFA, hold generally for the portion of the NFA present at surface 110, and in certain embodiments hold for any volume fraction of the NFA present in article 100, including embodiments in which substantially all of the NFA present in article 100 has the specified composition.

In one embodiment, the iron-bearing alloy matrix may further include one or more additional minor elements such as tungsten, silicon, manganese, or cobalt, for example. In one embodiment, the NFA matrix includes tungsten <3.5 wt %, silicon <0.5 wt %, manganese <0.5 wt %, phosphorous <0.005 wt %, sulfur <0.005 wt %, copper <0.08 wt %, and/or cobalt <0.1 wt %.

As mentioned above, in some embodiments of the present invention, a concentration of precipitated chromium- and/or molybdenum-containing secondary phases in the NFA is engineered to be low. In general, the chromium or molybdenum, upon exceeding local equilibrium solubility levels, precipitate as chi phase or sigma phase in the ferritic matrix.

Chi phase and sigma phase are intermetallic phases enriched in chromium, molybdenum, and iron. They are well-known in the art of ferrous metallurgy, and are usually found in high chromium and molybdenum steels as a result of heat treatment or thermo-mechanical processing in the temperature range from about 500° C. up to their solvus temperature, which, as is well-documented in the art, varies as a function of molybdenum and chromium content. Chi phase generally has body centered cubic crystal structure and sigma phase has tetragonal crystal structure. Chi phase is formed in lower chromium and molybdenum composition, while sigma phase is formed in higher chromium and molybdenum composition.

In one embodiment, a concentration of chi phase or sigma phase in the nanostructured ferritic alloy at surface 110 of the disclosed article 100 is less than about 5 volume percent. In another embodiment, a total concentration of the chi phase and sigma phase in the NFA is less than about 5 volume percent. In a specific embodiment, surface 110 is substantially free of both chi phase and sigma phase.

The nanofeatures used herein are typically formed in-situ in the NFA by the dissolution of an initially added oxide and the precipitation, typically during a consolidation step, of nanometer-sized clusters of a complex oxide. These complex oxide particles can serve to pin the grain structure, thus providing enhanced mechanical properties. A desirable grain size distribution of the NFA matrix may be achieved by controlling the processing parameters during preparation of the alloy.

In specific embodiments of this invention, the desired strength, ductility, and corrosion resistance of the surface of the article are achieved by careful control of the composition and processing of the NFA. To achieve good corrosion resistance, chromium and molybdenum are kept as solid solution elements in the ferritic matrix by using proper milling conditions (speed, time, mill kinetic energy), and post-forge annealing at sufficiently high temperature (higher than the solvus temperature of chromium and molybdenum-enriched phases such as sigma and chi) followed by cooling at a rate rapid enough to inhibit precipitation of chromium or molybdenum-enriched secondary phases.

Accordingly, in one embodiment, a method is provided for preparation of an article such as article 100, having a surface 110 comprising an NFA with the specific features described in various embodiments presented above. The method generally includes the steps of milling, consolidating, annealing, and cooling at a rate rapid enough to inhibit precipitation of sigma and chi phases.

A feedstock of an iron-bearing alloy powder is milled in the presence of yttrium oxide, typically in a particulate form, until the oxide is substantially dissolved into the alloy. In one embodiment, the iron-bearing alloy powder is milled in the presence of yttrium oxide until substantially all the yttrium oxide is dissolved into the alloy. The feedstock of the iron-bearing alloy powder may also contain titanium, chromium, and molybdenum, as well as any of the other additional elements described above as being potentially useful in the alloy of article 100. The feedstock may have to be milled with high speed and energy to obtain the desired levels of yttrium dissolution during milling, in accordance with practices known in the art. Different factors that may influence the milling energy and the final milled materials include strength, hardness, size, speed, and ratio of the milling media with respect to the feedstock material, and overall time and temperature of milling.

The milling atmosphere may vary. In one embodiment, the milling is carried out in an inert gas environment such as, for example, argon or nitrogen. In one embodiment, the milling environment of the feedstock is free of purposefully added carbon and nitrogen, as inclusion of carbonitride phases may reduce ductility of the component formed. In one embodiment, the feedstock is milled under a rough vacuum. A "rough vacuum" as used herein indicates an environmental pressure less than the atmospheric pressure in the process volume of the container. In one embodiment, the pressure inside the milling container in the processing volume is less than about $10^{-4}$ atmosphere.

The feedstock after high energy milling is subjected to a thermo-mechanical consolidation step, such as hot isostatic pressing, extruding, forging, or combinations of these processes, to form a consolidated component. For instance, the powder feedstock may be thermo-mechanically consolidated by first subjecting the powder to hot isostatic pressing, followed by forging or extruding. In another example, the powder feedstock may be mechanically compacted and then the compacted feedstock may be extruded. This thermo-mechanical consolidation step is performed at a sufficiently high temperature, and for sufficient time, to allow precipitation of the desired complex oxide nanofeatures within the alloy matrix, as described above. The time and temperature selected for this step can be readily designed based on the desired size and density of nanofeatures, and can be controlled to provide dispersions much finer than generally achieved by purely mechanical alloying processes. In some embodiments, the consolidating step is performed at a temperature of greater than about 800 degrees Celsius. This consolidation may occur in an inert environment or a rough vacuum to avoid incorporation of undue amounts of oxygen into the alloy.

The consolidated component is annealed at a temperature that is above the solvus temperatures of chi phase and sigma phase present in the alloy, and is held at the annealing temperature for sufficient time to dissolve these phases. The solvus temperatures for these phases depends in part on the relative amounts of the elements present and can be readily determined in any particular instance using techniques familiar to those of ordinary skill in the art. For instance, published phase diagrams of the chromium-iron-molybdenum system show that the solvus temperature for sigma and/or chi phases can range from about 600° C., for alloys with low amounts of chromium and molybdenum, to above 1100° C. for more highly alloyed material. The annealed component is then cooled to form a processed component having the characteristics noted previously for article 100. Specifically, the cooling is performed at a rate rapid enough to limit or prevent formation of chi and sigma phases at least at a surface, such as surface 110, of the processed component; low cooling rates afford more time for the alloy to approach thermodynamic equilibrium, and thus may result in precipitation of chi or sigma phases during cooling, thereby reducing the corrosion resistance of the material. Here, a cooling rate is deemed to be sufficiently rapid if it results in a concentration of chi phase or sigma phase at surface 110 less than about 5 volume percent. A cooling rate of the component that sufficiently inhibits formation of chi and sigma phase may be readily determined for any particular instance using techniques familiar to those of ordinary skill in the art. In one embodiment, the annealed component is water quenched from the annealing temperature. As noted previously, the zone of reduced chi and sigma phase precipitation relative to equilibrium that results from the annealing and quenching steps may extend further into the alloy than just surface 110, and may include any volume fraction of the alloy, up to and including substantially the entire alloy, depending in part on the method employed to achieve the quenching, the size of the alloy section being quenched, and other factors.

The processed component may itself be used as article 100, or the processed component may be used in further fabrication and/or assembly techniques to form article 100, oriented such that surface 110 is the surface noted above having the reduced concentration of sigma and/or chi phases due at least in part to the rapid cooling step.

The iron-bearing alloy powder that is used as the feedstock for the formation of the article surface herein may be prepared using different routes. For example, an iron-bearing alloy may be formed, melted, such as by vacuum induction melting, and then made into powder, such as by atomization in inert gas.

EXAMPLE

The following example illustrates the method, materials and results, in accordance with specific embodiments, and as such should not be construed as imposing limitations upon the claims. All components are commercially available from common chemical suppliers.

In one example method of preparation, pre-alloyed steel (Fe—Cr) powders doped with elemental metal powders (Cr, Mo, W, Ti) as necessary to match the nominal compositions of the desired NFAs were taken as starting materials and mixed with $Y_2O_3$ powder. Nominal compositions of the three desired NFAs—NFA 1, NFA 2, and NFA 3—that are used in this example are as listed in Table 1.

TABLE 1

Nominal compositions of example NFAs

| Alloy | Nominal Composition (wt. %) |
|---|---|
| NFA1 | Fe—14Cr—3W—5Mo—0.4Ti—0.25Y2O3 |
| NFA2 | Fe—14Cr—3W—5Mo—0.2N—0.4Ti—0.25Y2O3 |
| NFA3 | Fe—18Cr—10Mo—0.4Ti—0.25Y2O3 |

Alternatively, pre-alloyed powders of Fe—Cr—Mo or Fe—Cr—Mo—Ti may also be used as starting powders. All powders were mixed with 420 stainless steel balls (~4.5 mm in diameter) with a 10:1 ratio and milled in a high energy attrition mill for about 20 hours in an argon environment. During milling, the $Y_2O_3$ particles were dissolved and homogeneously redistributed in the metal matrix. The as-milled powders were in flake shapes with a size of about 50 μm to about 150 μm.

After milling, the powders were packed in a stainless steel can, evacuated, and then hot isostatically pressed (HIP) at about 920° C. temperature and about 200 MPa pressure for about 4 hours. The HIP process consolidates the powders into bulk materials and recrystallizes the microstructure to yield low-strain equiaxial grains. Complex oxide nanofeatures, here, ultrafine oxides including Y, Ti, and O (less than about 10 nm), form homogeneously inside grains and on grain boundaries during the heating stage of the HIP process.

After HIP, the contents were annealed at about 920° C. for about 2 hours and forged to a strain of about 50% to 70%. It was found that molybdenum-enriched chi phase or sigma phase existed in the as-forged NFA, as their solvus temperatures were higher than 920° C. As expected, the amount of chi or sigma phase was found to vary with molybdenum and chromium level in different NFA compositions.

After forging, the contents were subjected to isothermal annealing for about 30 minutes to about 1 hour above the solvus temperature of the chi or sigma phases, followed by a water quench. The solvus temperature was determined to be about 1000° C. for NFA1, about 1030° C. for NFA 2, and about 1130° C. for NFA 3. During the isothermal annealing step, large amounts of chi and/or sigma phases dissolve back into the matrix. The annealing time required to achieve the desired levels of dissolution may also vary with composition and processing history.

Figure 2:
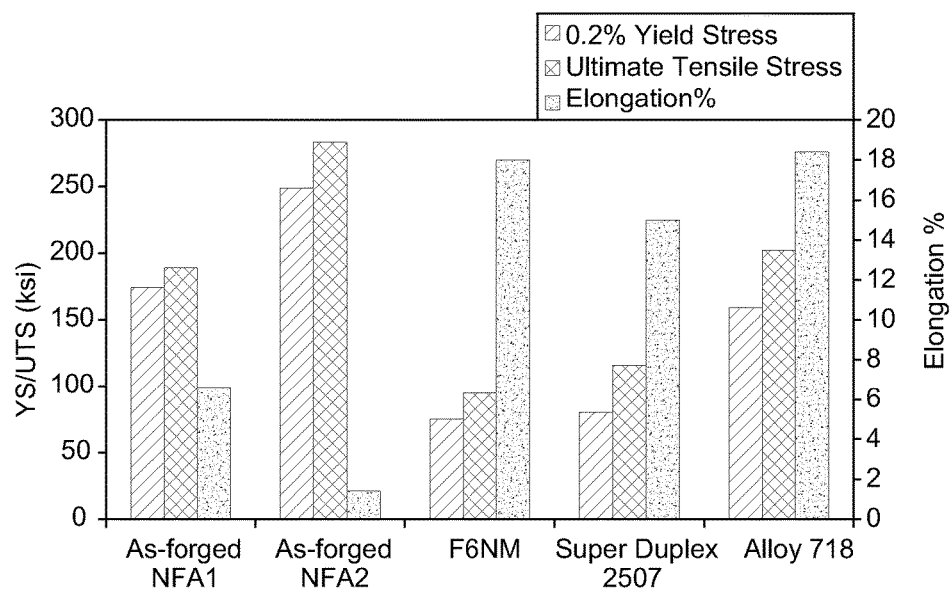
FIG. 2 is a comparison of room-temperature tensile properties of as-forged NFA with two baseline steels and a Ni-based alloy 718, in accordance with one embodiment of the invention.

FIG. 2 summarizes room-temperature tensile properties of two of the as-forged NFA (without a subsequent heat treatment)—as-forged NFA 1 and as-forged NFA 2, compared with 2 widely used baseline steels—F6NM and super duplex 2507, and Ni-based alloy 718. The two as-forged NFAs showed approximately 2× higher yield strength and ultimate tensile strength than baseline steels. Ductility of the NFA in the as-forged state was lower than steels, due to the existence of chi phase. Tensile strength of heat-treated NFAs is expected to decrease marginally, and ductility is expected to increase in the heat treated NFAs.

Figure 3:
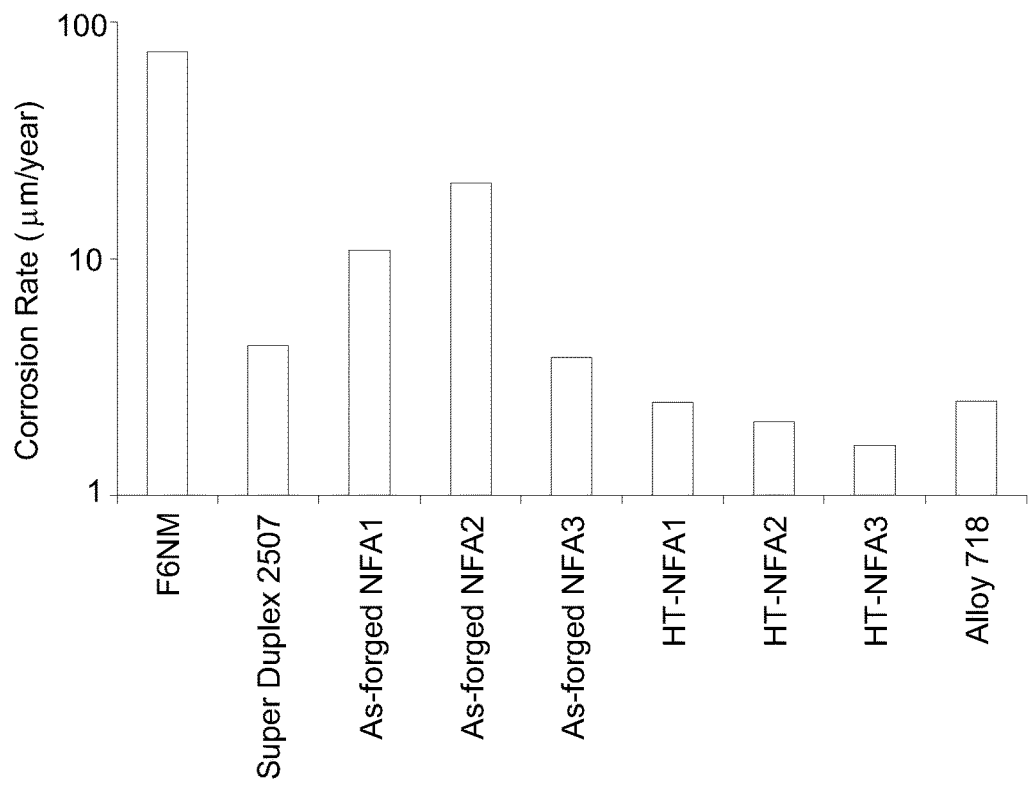
FIG. 3 is a comparison of corrosion properties of the as forged and heat-treated NFAs with two baseline steels and a Ni-based alloy 718 in NACE TM0177 Solution A (5% NaCl and 0.5% $CH_3COOH$, deaerated), in accordance with one embodiment of the invention.

Room-temperature corrosion tests were performed in NACE TM0177 solution A (5% NaCl and 0.5% CH$_3$COOH, deaerated) to compare the general corrosion rate of the prepared NFAs with conventional steels and Ni-based superalloy 718 in a chloride environment. The chart in FIG. 3 summarizes the results. As-forged NFA1, as-forged NFA2, as-forged NFA3 are the three NFA samples that did not undergo any post-forge heat treatment. HT-NFA1, HT-NFA2, HT-NFA3 are the three NFA samples corresponding to as-forged NFA1, as-forged NFA2, and as-forged NFA3 respectively, and were (after forging) heat-treated isothermally above the solvus temperature of their chi and sigma phases and water-quenched. These NFA samples were compared with F6NM, super duplex 2507, and Ni-based alloy 718. It can be seen from FIG. 3 that the three as-forged NFAs have lower corrosion rates than F6NM, but higher corrosion rates than super duplex 2507. Post-forge heat treatment successfully reduced the corrosion rates to lower than super duplex 2507 and comparable to alloy 718. These results demonstrated that heat treatment with proper quenching was a key step to improve corrosion properties.

While only certain features of the invention have been illustrated and described herein, many modifications and changes will occur to those skilled in the art. It is, therefore, to be understood that the appended claims are intended to cover all such modifications and changes as fall within the true spirit of the invention.

The invention claimed is:

1. A method, comprising:
    milling an iron-bearing alloy powder in the presence of yttrium oxide until the oxide is substantially dissolved into the alloy;
    thermo-mechanically consolidating the powder to form a consolidated component;
    annealing the consolidated component to form an annealed component; and
    cooling the annealed component at a rapid rate to form a processed component,
    wherein the processed component comprises a surface comprising a nanostructured ferritic alloy, the nanostructured ferritic alloy comprising a plurality of nanofeatures disposed in an iron-bearing alloy matrix, the plurality of nanofeatures comprising complex oxide particles, wherein the complex oxide particles comprise yttrium and titanium;
    wherein the matrix at the surface comprises about 5 weight percent to about 30 weight percent chromium, and about 0.1 weight percent to about 10 weight percent molybdenum;
    wherein a concentration of a chi phase or a sigma phase in the nanostructured ferritic alloy at the surface is less than about 5 volume percent; and
    wherein the annealing step is performed at a temperature above the solvus temperature of the chi phase and the sigma phase.

2. The method of claim 1, wherein the step of thermo-mechanically consolidating comprises hot isostatic pressing, extruding, forging, compacting, or a combination of any of these.

3. The method of claim 1, wherein the surface is substantially free of chi phase.

4. The method of claim 1, wherein the surface is substantially free of sigma phase.

5. The method of claim 1, wherein cooling the annealed component at a rapid rate comprises cooling at a rate rapid enough to inhibit precipitation of chromium or molybdenum-enriched secondary phases.

6. The method of claim 1, wherein cooling the annealed component at a rapid rate comprises water quenching the annealed component.

7. The method of claim 1, wherein the matrix comprises molybdenum in an amount from about 3 weight percent to about 10 weight percent.

8. The method of claim 7, wherein the matrix comprises molybdenum in an amount from about 6 weight percent to about 10 weight percent.

9. The method of claim 1, wherein the consolidated component comprises sigma phase.

* * * * *